Patented Jan. 19, 1954

2,666,736

UNITED STATES PATENT OFFICE 2,666,736

SEPARATION OF n-PROPYL AND SEC. BUTYL ALCOHOLS BY AZEOTROPIC DISTILLATION

Nat C. Robertson and James W. Walker, Corpus Christi, Tex., assignors to Celanese Corporation of America, New York, N. Y., a corporation of Delaware No Drawing. Application June 9, 1950, Serial No. 167,259

5 Claims. (Cl. 202—42)

This invention relates to the separation of alcohols, and relates more particularly to an improved process for the separation of n-propyl alcohol from secondary butyl alcohol.

An object of this invention is the provision of an improved process for the separation of n-propyl alcohol from a mixture of n-propyl alcohol and secondary butyl alcohol by distillation methods.

Another object of this invention is to provide an improved azeotropic distillation process for the separation of n-propyl alcohol in purified form from a crude mixture of n-propyl alcohol and secondary butyl alcohol.

Other objects of this invention will appear from the following detailed description.

The vapor phase partial oxidation of aliphatic hydrocarbons such as propane or butane, or mixtures thereof, employing air or oxygen as the oxidizing agent yields a complex mixture of oxygenated organic compounds. The mixture obtained is separated into a number of fractions, each containing a plurality of compounds, by suitable distillation operations. One such fraction obtained comprises essentially n-propyl alcohol and secondary butyl alcohol. However, since the boiling points of said alcohols differ only slightly, a satisfactory separation of said alcohols by an ordinary straight fractional distillation is not commercially feasible.

We have now found that n-propyl alcohol may be separated in a highly efficient manner from a mixture of n-propyl alcohol and secondary butyl alcohol by subjecting said mixture to azeotropic distillation in admixture with an aliphatic hydrocarbon in the presence of an excess of water. On subjecting the mixture thus formed to distillation, a ternary azeotrope comprising the aliphatic hydrocarbon, water and n-propyl alcohol distills over. Since the aliphatic hydrocarbon is substantially insoluble in water, the ternary azeotrope phases out into layers, the upper layer comprising the aliphatic hydrocarbon and the lower layer an aqueous solution of n-propyl alcohol containing some secondary butyl alcohol and aliphatic hydrocarbon. On distillation of the aqueous layer, n-propyl alcohol of a relatively high degree of purity, containing little or no secondary butyl alcohol, is recovered. The hydrocarbon layer is recycled to the distilling column, while the aqueous layer remaining after the removal of the n-propyl alcohol therefrom may be discarded or may also be recycled to the azeotropic distillation column.

After removal of the n-propyl alcohol from the crude mixture in the initial ternary azeotrope formed, further distillation of the remainder yields a ternary azeotrope comprising secondary butyl alcohol, water and aliphatic hydrocarbon. The hydrocarbon may be separated from the aqueous phase by decantation and the aqueous phase remaining then subjected to distillation to yield secondary butyl alcohol of over 90% purity. Alternatively, the hydrocarbon remaining after the n-propyl alcohol has been removed may be decanted and the secondary butyl alcohol then distilled over as its binary azeotrope with water in better than 90% purity.

Most advantageously, the initial azeotropic distillation whereby the ternary azeotrope consisting of n-propyl alcohol, water and hydrocarbon is obtained, is carried out until an amount of alcohol corresponding to 80 to 100% of the n-propyl alcohol present in the original charge to the reboiler has distilled over.

As examples of aliphatic hydrocarbons which may be employed in effecting our novel distillation process there may be mentioned cyclohexane, n-octane, methyl cyclohexane, 2,5-dimethyl hexane and similar hydrocarbons boiling in the range 65 to 135° C. and preferably in the range 80 to 125° C.

In order further to illustrate our invention but without being limited thereto, the following examples are given:

*Example I*

100 parts by weight of a crude mixture containing 45.3% by weight of n-propyl alcohol, 14.2% by weight of secondary butyl alcohol and 40.5% by weight of a mixture of higher-boiling alcohols such as isobutyl, n-butyl and amyl alcohols as well as some oxides and acetals, are fed to the reboiler of a 30 tray distilling column together with 100 parts by weight of cyclohexane and 400 parts by weight of water. The reboiler is heated and a distillation of the mixture in the reboiler takes place. Distillation is continued until 40% of the alcohols present in the reboiler has distilled over. The overhead product or distillate which is obtained comprises a ternary azeotrope of n-propyl alcohol-cyclohexane-water. The azeotrope is condensed and passed to a decanter where it partitions or phases into two layers. The hydrocarbon layer is separated and returned to the column as reflux, and the aqueous layer, which comprises an approximately 16% by weight aqueous solution of n-propyl alcohol is then distilled. The distillate from the aqueous layer comprises n-propyl alcohol free of secondary butyl alcohol. About 89% of the n-propyl alcohol which was originally present in the reboiler of the azeotropic distilling column in the form of the initial crude mixture charged thereto is recovered by this distillation treatment and in a purity of greater than 99%. On distillation of the mixture remaining in the reboiler after the n-propyl alcohol has been removed, a second ternary azeotrope consisting of water, secondary butyl alcohol and cyclohexane distills over. This ternary azeotrope phases out into an aqueous layer and a cyclohexane layer upon condensation, and, after decantation of the cyclohexane the aqueous layer is distilled. Secondary butyl alcohol of a purity of over 90% is obtained on distillation of this second aqueous layer.

Example II 100 parts by weight of a crude mixture containing 45.3% by weight of n-propyl alcohol, 14.2% by weight of secondary butyl alcohol and 40.5% by weight of a mixture of higher-boiling alcohols such as isobutyl, n-butyl and amyl alcohols as well as small amounts of oxides and acetals, are fed to the reboiler of a 45 plate distilling column together with 400 parts by weight of water and 100 parts by weight of methylcyclohexane. The reboiler is heated and the mixture distilled. The distillate obtained comprises a ternary azeotrope of n-propyl alcohol, methylcyclohexane and water. The distillate is condensed and the hydrocarbon layer which separates out is decanted and returned to the column as reflux. Distillation is continued until 40% of the alcohols in the reboiler has distilled over. The aqueous layer remaining comprises an approximately 25% aqueous solution of n-propyl alcohol. On distillation of the aqueous layer, n-propyl alcohol of a purity of greater than 99% is obtained, the purified n-propyl alcohol comprising 89% of the n-propyl alcohol present in the initial crude mixture.

Employing a 30 plate column to carry out the above distillation process, 87% of the n-propyl alcohol containing about 1.9% of secondary butyl alcohol is recovered. On continuing the distillation after the first ternary azeotrope has been separated, a secondary ternary azeotrope distills over. The secondary ternary azeotrope also phases out into an aqueous and a hydrocarbon layer. On distilling the aqueous layer, purified secondary butyl alcohol is obtained.

Example III

When the process described in Example II is carried out employing n-octane as the azeotroping agent and a 45 plate distilling column, 82% of the n-propyl alcohol is recovered but the n-propyl alcohol contains about 7.7% of secondary butyl alcohol.

It is to be understood that the foregoing detailed description is given merely by way of illustration and that many variations may be made therein without departing from the spirit of our invention.

Having described our invention, what we desire to secure by Letters Patent is:

1. Process for the separation by distillation operations of a crude mixture of alcohols including n-propyl and secondary butyl alcohol, which comprises adding water and an azeotroping agent, selected from the group consisting of cyclohexane and methylcyclohexane, to the crude mixture, distilling the resulting mixture to form a ternary azeotrope comprising water, n-propyl alcohol and the azeotroping agent, condensing the ternary azeotrope, decanting the aqueous layer formed on condensation of said ternary azeotrope, and distilling the aqueous layer to obtain purified n-propyl alcohol.

2. Process for the separation by distillation operations of a crude mixture of alcohols including n-propyl alcohol and secondary butyl alcohol, which comprises adding water and an azeotroping agent comprising cyclohexane to the crude mixture, distilling the resulting mixture to form a ternary azeotrope comprising water, n-propyl alcohol and cyclohexane, continuing the distillation of the mixture until an amount of alcohol corresponding to 85 to 100% of the n-propyl alcohol originally present in the mixture has distilled over as the ternary azeotrope, condensing the ternary azeotrope, decanting the aqueous layer formed on condensation of said ternary azeotrope, and distilling the aqueous layer to obtain purified n-propyl alcohol.

3. Process for the separation by distillation operations of a crude mixture of alcohols including n-propyl alcohol and secondary butyl alcohol, which comprises adding water and an azeotroping agent comprising methylcyclohexane to the crude mixture, distilling the resulting mixture to form a ternary azeotrope comprising water, n-propyl alcohol and methylcyclohexane, continuing the distillation of the mixture until an amount of alcohol corresponding to 85 to 100% of the n-propyl alcohol originally present in the mixture has distilled over as the ternary azeotrope, condensing the ternary azeotrope, decanting the aqueous layer formed on condensation of said ternary azeotrope, and distilling the aqueous layer to obtain purified n-propyl alcohol.

4. Process for the separation by distillation operations of a crude mixture of alcohols including n-propyl alcohol and secondary butyl alcohol, which comprises adding water and an azeotroping agent comprising cyclohexane to the crude mixture, distilling the resulting mixture to form a ternary azeotrope comprising water, n-propyl alcohol and cyclohexane, continuing the distillation of the mixture until an amount of alcohol corresponding to 85 to 100% of the n-propyl alcohol originally present in the mixture has distilled over as the ternary azeotrope, condensing the ternary azeotrope, decanting the aqueous layer formed on condensation of said ternary azeotrope, and distilling the aqueous layer to obtain purified n-propyl alcohol, continuing the distillation of the mixture remaining after the initial ternary azeotrope has been distilled to form a second ternary azeotrope comprising water, secondary butyl alcohol and cyclohexane, condensing the ternary azeotrope obtained, decanting the aqueous layer and distilling the same to separate secondary butyl alcohol therefrom.

5. Process for the separation by distillation operations of a crude mixture of alcohols, including n-propyl alcohol and secondary butyl alcohol, which comprises adding water and an azeotroping agent comprising methylcyclohexane to the crude mixture, distilling the resulting mixture to form a ternary azeotrope comprising water, n-propyl alcohol and methylcyclohexane, continuing the distillation of the mixture until an amount of alcohol corresponding to 85 to 100% of the n-propyl alcohol originally present in the mixture has distilled over as the ternary azeotrope, condensing the ternary azeotrope, decanting the aqueous layer formed on condensation of said ternary azeotrope, and distilling the aqueous layer to obtain purified n-propyl alcohol, continuing the distillation of the mixture remaining after the initial ternary azeotrope has been distilled to form a second ternary azeotrope comprising water, secondary butyl alcohol and methylcyclohexane, condensing the ternary azeotrope obtained, decanting the aqueous layer and distilling the same to separate secondary butyl alcohol therefrom.

NAT C. ROBERTSON.
JAMES W. WALKER.

References Cited in the file of this patent

UNITED STATES PATENTS

| Number | Name | Date |
|---|---|---|
| 2,483,246 | Stribley | Sept. 27, 1949 |
| 2,487,086 | Amick et al. | Nov. 8, 1949 |
| 2,591,877 | Robertson et al. | Apr. 8, 1952 |

OTHER REFERENCES

"Azeotropic Data," compiled by L. H. Horsley, Analytical Chemistry, vol. 19, August 1947, pages 586–588.